US012699971B2

(12) United States Patent
Hupel

(10) Patent No.: US 12,699,971 B2
(45) Date of Patent: Aug. 4, 2026

(54) METHOD FOR REGISTERING OF TOKEN, A TOKEN REFERENCE REGISTER, SECURE TRANSACTION UNIT, AND ELECTRONIC PAYMENT TRANSACTION SYSTEM

(71) Applicant: Giesecke+Devrient advance52 GmbH, Munich (DE)

(72) Inventor: Lars Hupel, Munich (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 0 days.

(21) Appl. No.: 18/612,122

(22) Filed: Mar. 21, 2024

(65) Prior Publication Data

US 2024/0320662 A1 Sep. 26, 2024

(30) Foreign Application Priority Data

Mar. 22, 2023 (EP) .................................... 23020147

(51) Int. Cl.

| | |
|---|---|
| *G06Q 20/06* | (2012.01) |
| *G06Q 20/02* | (2012.01) |
| *G06Q 20/36* | (2012.01) |
| *G06Q 20/38* | (2012.01) |
| *H04L 9/00* | (2022.01) |
| *H04L 9/32* | (2006.01) |
| *H04L 9/40* | (2022.01) |

(52) U.S. Cl.
CPC ......... *G06Q 20/0655* (2013.01); *G06Q 20/02* (2013.01); *G06Q 20/3672* (2013.01); *G06Q 20/3678* (2013.01); *G06Q 20/3827* (2013.01); *H04L 9/3239* (2013.01); *H04L 9/3263* (2013.01); *H04L 9/3268* (2013.01); *H04L*

*9/3297* (2013.01); *H04L 9/40* (2022.05); *H04L 9/50* (2022.05); *G06Q 20/3825* (2013.01); *H04L 2209/56* (2013.01)

(58) Field of Classification Search
CPC ........... G06Q 20/0655; G06Q 20/3672; G06Q 20/3825; G06Q 20/02; G06Q 20/3678; G06Q 20/3827; H04L 2209/56; H04L 9/3239; H04L 9/3263; H04L 9/3268; H04L 9/3297; H04L 9/40; H04L 9/50
USPC ......................................................... 705/66
See application file for complete search history.

(56) References Cited

U.S. PATENT DOCUMENTS

| | | | |
|---|---|---|---|
| 6,076,078 A | 6/2000 | Camp et al. | |
| 2015/0220917 A1 | 8/2015 | Aabye et al. | |

(Continued)

FOREIGN PATENT DOCUMENTS

| | | |
|---|---|---|
| DE | 102021002329 A1 | 11/2022 |
| DE | 102021004023 A1 | 2/2023 |

(Continued)

OTHER PUBLICATIONS

De Guzman et al. "Enhanced Secure Hash Algorithm-512 based on Quadratic Function", IEEE, Mar. 12, 2019, 6 pages (Year: 2019).*

(Continued)

*Primary Examiner* — James D Nigh
(74) *Attorney, Agent, or Firm* — Workman Nydegger

(57) ABSTRACT

A method involves registering of a token in an electronic payment transaction system, and a token reference register. A secure transaction unit and an electronic transaction system, such as an electronic payment transaction system, involves aspects of the method and token reference register.

15 Claims, 10 Drawing Sheets

TS

(56) References Cited

U.S. PATENT DOCUMENTS

| | | |
|---|---|---|
| 2015/0312038 A1 | 10/2015 | Palanisamy |
| 2019/0130391 A1 | 5/2019 | Wright et al. |
| 2021/0233069 A1 | 7/2021 | Wang et al. |
| 2025/0124413 A1* | 4/2025 | Fasching ............... G06F 21/602 |
| 2025/0225494 A1* | 7/2025 | Ghosh .................. G06Q 20/367 |

FOREIGN PATENT DOCUMENTS

| | | |
|---|---|---|
| DE | 102021004548 A1 | 3/2023 |
| EP | 2541478 A1 | 2/2013 |
| EP | 3671602 A1 | 6/2020 |
| WO | 2020212331 A1 | 10/2020 |
| WO | 2020212337 A1 | 10/2020 |
| WO | 2021170645 A1 | 9/2021 |
| WO | 2021170646 A1 | 9/2021 |

OTHER PUBLICATIONS

Naor et al. Universal One-Way Hash Functions and their Cryptographic Applications, 1989 ACM 0-89791-307-8/89/0005/0033, pp. 33-43 (Year: 1989).*
European Search Report from corresponding EP Application No. 23020147.7, Jul. 12, 2023.

* cited by examiner

TS

TS

| Type of command CO | Description | Command Code |
|---|---|---|
| *CREATE* | *Create new T in TS* | *0x01* |
| *DELETE* | *Delete existing T in TS* | *0x02* |
| SWITCH | Switch in an existing T in a new T | 0x03 |
| SPLIT | Split an existing T in two or more (smaller) T | 0x04 |
| MERGE | Merge two or more existing T into one T | 0x05 |

Fig. 4a

| Type of command CO | Signature |
|---|---|
| *CREATE* | $RR_{sig\_TUI} = SIG\ (pKey_{TU\text{-}I},\ [CREATE,\ TR])$ |
| *DELETE* | $RR_{sig\_TUI} = SIG\ (pKey_{TU\text{-}I},\ [DESTROY,\ TR])$<br>$RA_{sig\_T} = SIG\ (r,\ [DESTROY,\ TR])$ |
| SWITCH | $RR_{sig\_Ta} = sig\ (r_a,\ [SWITCH,\ TR_a\ TR_b])$ |
| SPLIT | $RR_{sig\_Ta} = sig\ (r_a,\ [SPLIT,\ TR_a\ TR_b\ TR_c])$ |
| MERGE | $RR_{sig\_Ta} = sig\ (r_a,\ [MERGE,\ TR_a\ TR_b\ TR_c])$<br>$RR_{sig\_Tb} = sig\ (r_b,\ [MERGE,\ TR_a\ TR_b\ TR_c])$ |

Fig. 4b

$$RR_{sig\_TU\text{-}I} = SIG\ (pKey_{TUI},\ [CREATE,\ TR])$$

| Layer of TS | Inputs | Actions | Outputs |
|---|---|---|---|
| TU-LAY | none | Create r *(Create R)* 21, 22 | New T |
| T-Reg-LAY | $RR_{sig\_TH}$ | 42 & 45 of $RR_{sig\_TUI}$ | New TR |

$$RR_{sig\_TUI} = SIG\ (pKey_{TUI},\ [DESTROY,\ TR])$$

$$RR_{sig\_T} = SIG\ (r,\ [DESTROY,\ TR])$$

| Layer of TS | Inputs | Actions | Outputs |
|---|---|---|---|
| TU-LAY | T | 22 → $RR_{sig\_TUI}$<br>22 → $RR_{sig\_T}$ | Deleted T |
| T-Reg-LAY | TR,<br>$RR_{sig\_TUI}$,<br>$RR_{sig\_T}$ | 42 & 44 of<br>$RR_{sig\_TUI}$ and<br>$RA_{sig\_T}$ | Deleted TR |

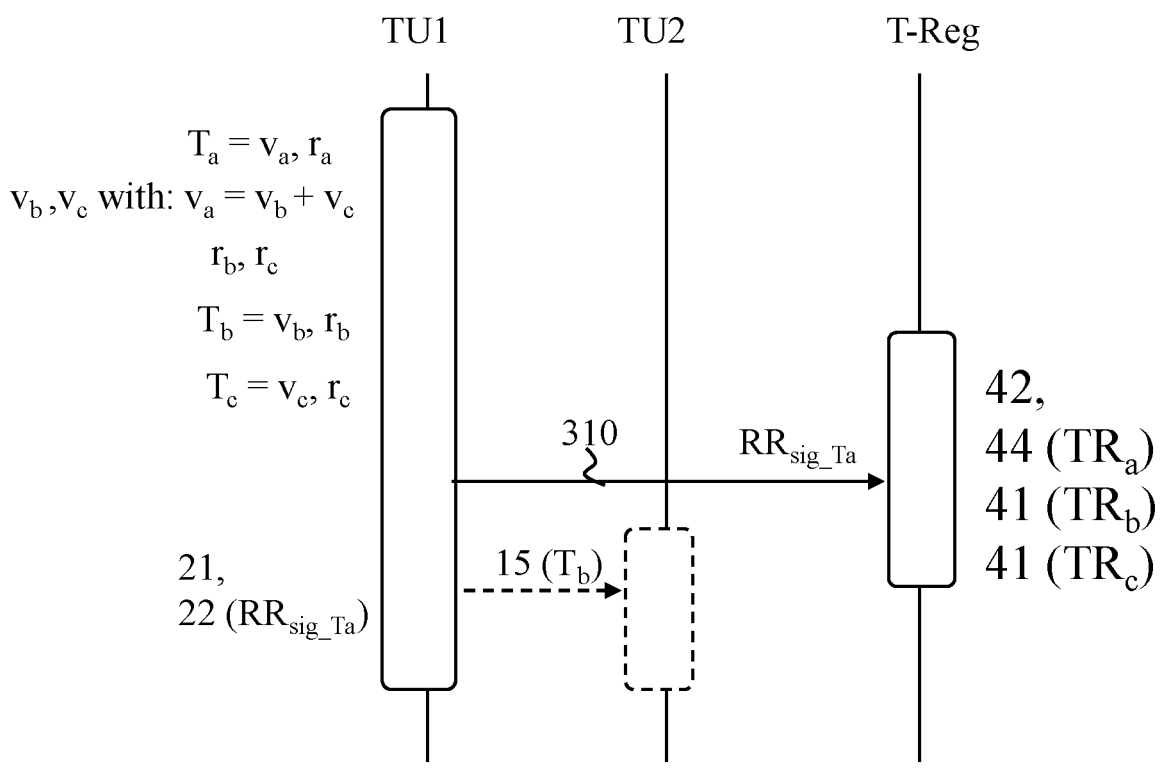
$$RR_{sig\_Ta} = sig\ (r_a,\ [SPLIT,\ TR_a\ TR_b\ TR_c])$$
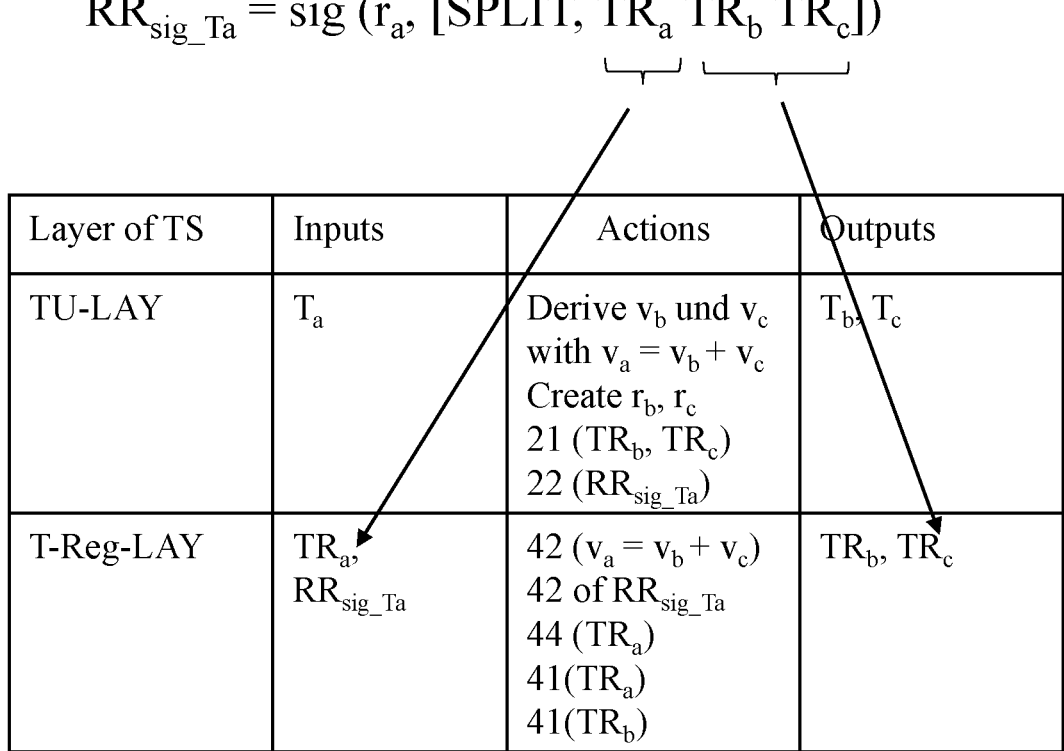
| Layer of TS | Inputs | Actions | Outputs |
|---|---|---|---|
| TU-LAY | $T_a$ | Derive $v_b$ und $v_c$ with $v_a = v_b + v_c$ Create $r_b$, $r_c$ 21 ($TR_b$, $TR_c$) 22 ($RR_{sig\_Ta}$) | $T_b$, $T_c$ |
| T-Reg-LAY | $TR_a$, $RR_{sig\_Ta}$ | 42 ($v_a = v_b + v_c$) 42 of $RR_{sig\_Ta}$ 44 ($TR_a$) 41($TR_a$) 41($TR_b$) | $TR_b$, $TR_c$ |
Fig. 7

$$RR_{sig\_Td} = sig\ (r_d,\ [MERGE,\ TR_d\ TR_e\ TR_f])$$

$$RR_{sig\_Te} = sig\ (r_e,\ [MERGE,\ TR_d\ TR_e\ TR_f])$$

| Layer of TS | Inputs | Actions | Outputs |
|---|---|---|---|
| TU-LAY | $T_d$, $T_e$ | Calculate $v_f = v_d + v_e$<br>Create $r_f$<br>21<br>22 ($RA_{sig\_Td}$)<br>22 ($RA_{sig\_Te}$) | $T_f$ |
| T-Reg-LAY | $TR_d$, $TR_e$<br>$RR_{sig\_Td}$<br>$RR_{sig\_Te}$ | 42 ($v_f = v_d + v_e$)<br>42 of $RA_{sig\_Td}$<br>42 of $RA_{sig\_Te}$<br>44 ($TR_d$)<br>44 ($TR_d$)<br>41 ($TR_f$) | $TR_f$ |

$$RR_{sig\_Tg} = sig\ (r_g,\ [SWITCH,\ TR_g\ TR_h])$$

| Layer of TS | Inputs | Actions | Outputs |
|---|---|---|---|
| TU-LAY | $T_g$ | Create $r_h$<br>21,<br>22 ($RA_{sig\_Tg}$) | $T_h$ |
| T-Reg-LAY | $TR_g$<br>$RR_{sig\_Tg}$ | 42 ($v_g = v_h$)<br>42 ($RA_{sig\_Tg}$)<br>44 ($TR_g$)<br>41 ($TR_h$) | $TR_h$ |

METHOD FOR REGISTERING OF TOKEN, A TOKEN REFERENCE REGISTER, SECURE TRANSACTION UNIT, AND ELECTRONIC PAYMENT TRANSACTION SYSTEM

BACKGROUND

The invention relates to a method for registering of token in an electronic payment transaction system. The invention also relates to a token reference register. The invention further relates to a secure transaction unit. The invention also relates to an electronic transaction system in particular an electronic payment transaction system.

Tokens—also referred to as digital assets, electronic coins, coin data sets—may represent any digital asset, in particular a digital currency, preferably a central bank digital currency, short CBDC. These tokens are issued and deleted by an issuing unit of the payment transaction system, such as an issuing authority, or a central bank unit or a commercial bank unit, hereinafter also referred to as secure token issuing unit.

Electronic token transactions and/or storage of tokens and any associated transaction data and/or storage data in an electronic payment transaction system must be safe and secure and so, means for protecting confidentiality, integrity, and availability of exchanged and/or stored token data must be implemented. This is especially true for electronic payment transactions and associated payment transactions and payment storages in which a monetary value is linked with each token.

There are different technical approaches for a digital asset e.g. digital currency such as CBDC, issued by a central bank.

According to a first approach, tokens are merely cryptographically secured by the central bank unit and the cryptographically secured tokens are exchanged directly between token transaction units—also referred to as secure wallets and/or secure elements—of the participants in the electronic payment system in an encrypted manner. The exchanged token may also be stored in an encrypted manner. The token transaction units can verify the authenticity of the tokens based on the cryptographic security, such as keys and signatures, and for example checks a certificate from the central bank and/or the other token transaction units for validity within the certificate hierarchy in advance via online access or following the offline-protocol of the system.

According to a second approach, tokens are stored in a centralized or decentralized blockchain/distributed ledger of the payment transaction system, e.g., organized by a central bank unit. For a payment transaction, an ownership of a token record changes in the blockchain for which a lot of information (sender/recipient/amount) is required and/or even published. Sender and recipient of the token need an online access to the blockchain at the time of the transaction.

According to a favorable third approach as for instance described in WO 2020/212 331 A1 tokens are stored in a local token management unit (also called wallet or payment application unit or secure element) to be directly exchanged between participants of an electronic payment transaction system. The transferred token can validly be used after receipt from another participant without a need of approval or verification via an online connection. So, if an online connection is not available or inconvenient or should not be used for a specific token transaction, it remains possible to validly transfer tokens directly between participants in the electronic payment transaction system. A token reference register stores token references of all valid tokens without knowing the tokens itself. So, the user can check validity of a received token. The token reference register only stores token references of the corresponding token. Tokens can be further modified by each participant of the payment transaction system. Participants may replace registered token references by new token references. Of course, the overall monetary value in the token reference register will not change upon replacement. Accordingly, a registered token may be switched to a new token (SWITCH request), a token may be split into new tokens (SPLIT request) or multiple tokens may be merged into a new token (MERGE request).

The token references established by the third approach comprise at least a public key of a token-individual key pair as a token reference element. The corresponding private key of that token-individual key pair is a token element of the token to which the token reference refers.

Token-individual key pairs and/or the digital signatures as used in the third approach are generated with an elliptic curve cryptography, ECC, algorithm. Such an ECC-algorithm is based on a discrete logarithm problem which is considered to not be quantum safe. This is because quantum computing technics can use efficient ways to solve the discrete logarithm problem. By solving the discrete logarithm problem, the private key of the token-individual key pair can be calculated based on the corresponding public key. Revealing the private key means that an attacker has knowledge (=ownership) of the token and can spend it.

This attack scales further if someone were to gain read-only access to the token reference register.

So, it is desirable to further increase the safety and confidentiality, such as having a quantum safety or at least get close to quantum safety and to avoid attacks as described above.

SUMMARY

In an aspect of the present invention there is provided a method for registering of token of an electronic payment transaction system. Each token comprises at least a monetary value and a private key of a token-individual key pair as token elements.

The method comprising a receiving-step, namely receiving, at a token reference register of the electronic payment transaction system, a registration request. The registration request comprises at least one token reference(s). Each token reference is uniquely assigned to a token. Each token reference comprises a hash value, that is directly or indirectly derived from the private key of the token-individual key pair, as a token reference element. For example, the registration request can be sent by a transaction unit of the payment transaction system or a secure token issuer of the payment transaction system.

The token reference register is a unit of the electronic payment transaction system that stores the token references, whereby the associated tokens are registered. This token reference register can be a central database or storage unit of the transaction system. This register may be a decentralized ledger. The token reference register may (further) maintain a history of token references and/or registration requests.

The method further comprising a verifying-step, namely verifying, by a verification unit of the token reference register, at least one criteria in the token reference register for the received registration request.

The method comprising a storing-step, namely storing, in a storage unit of the token reference register, the at least one token references of the received registration request for registering the token uniquely assigned to this token reference, in case the at least one criteria is met in the token reference register for the received registration request.

With the storing of the token reference, a registration of the token uniquely assigned to the received token reference takes place in the payment transaction system.

A token reference is stored only once in the token reference register. Since a token reference of a token exists only once in the transaction system, the verifying step can determine whether an attempt was made to spend a token more than once.

The criteria could be called a register criteria or storage criteria. Accordingly, the criteria in the token reference register is verified for the received registration request and the received registration request (as such) could additionally be verified in the verification unit, preferably in advance to verifying the criteria in the token reference register.

With the herein described method it is now possible to not reveal a public key of the token-individual key pair, as it is made in the known art as discussed above. Not revealing a public key—as a token reference element—in the token reference register avoids that an attacker is able to deduce the private key of the token-individual key pair and would then be equipped with sufficient knowledge to spend the token.

Instead of revealing the public key, the present invention suggests using a hash value that is directly or indirectly derived from the private key of the token-individual key pair. So, a unique assignment between a token and a token reference is achieved and the security is enhanced since no public key (derived by an ECC algorithm) is used.

The token reference may comprise a hash value that is directly (or indirectly) computed from the private key of the token-individual key pair as a token reference element. So, the hash value is derived by applying a hash function on the private key. This reduces computation time and safes computation resource when generating the hash value.

The token reference may comprise a hash value that is directly computed from a public key of the token-individual key pair as a token reference element. So, the hash value is derived by applying a hash function on the public key. So, the public key—e.g. for later ownership proof—is computed first, e.g. using a ECC algorithm, and afterwards, the hash value is computed. So, the hash value is indirectly derived from the private key.

The hash value may be derived as a result from a SHA-512-algorithm. The SHA-512 algorithm is a cryptographic function that is quantum safe. So, it is not possible to obtain the private key from the hash value. In consequence, that means that the token reference register now tracks hashes of the token references instead of tracking the public keys directly.

Now, performing a registration request at the token reference register does not reveal any information about the public key. In turn, an attacker cannot use quantum computing techniques to deduce the private key, since the SHA-512 algorithm is resistant to preimage attacks.

Alternatively, the hash value may be derived as a result from a SHA-256-algorithm. Using the SHA-512 algorithm means that the registration request requires more data compared to using registration requests with the public key as token reference element. If data transmission and storage is a design issue in the electronic payment system, a SHA-256 algorithm (instead of a SHA-512 algorithm) may be used. Although SHA-256 is not quantum safe. Private key recomputing can still be avoided when using a strong random number generation algorithm for generating the private key (as token element of the token).

The token reference may further comprise the monetary value of the uniquely assigned token. This monetary value can be used to further validate the registration request at the token reference register. Hence, the token reference may comprise the hash value and the monetary value as token reference (data) elements. In embodiments the hash value may be directly computed from the private and/or public key of the token-individual key pair as well as the monetary value.

In preferred embodiments the registration request could be an addition request from a secure token issuing unit of a token issuer of the transaction system, requesting the addition of the token reference of a new token to the token reference register. In the system only the token issuer may add and/or delete token references to/from the token reference register. The registration request could be a replacement registration request from a transaction unit of the transaction system, requesting at least one input token reference stored in the token reference register to be replaced in the token reference register by the at least one (output) token reference to be stored. The replacement registration request may comprise m input token references and n output token references (m, n=1, 2, . . . ).

In addition to the token reference(s), which comprise the (respective) hash value but do not comprise the (respective) public key of the token-individual key pair of the token, the received registration request may comprise one or more further token reference(s), preferably input token references, assigned to further token(s). The further token reference(s) comprise a public key of an token-individual key pair of the further token(s). The public key of the token-individual key pair allows the token reference register, in particular the verifier unit, to verify a signature created by the secret key of the token-individual key pair. Preferably, the public key is included only in (input) token reference(s) of the registration request for token reference(s) to be deleted. Again, in contrast thereto, output token reference(s) to be stored in the token reference register do not include the public key.

Preferably, in the verifying step it is verified whether the at least one token reference of the received registration request is not stored in the storage unit of the token reference register and/or if an input token reference of the received registration request is stored in the storage unit of the token reference register. Furthermore or alternatively the verifying step may comprise verifying whether the registration request is not already stored in an archive of previous registration requests of the token reference register. Preferably, each registration request processed in the token register, in particular registration requests for which the storing step in the storage unit was performed, will be stored in the archive of previous registration requests.

One aspect of registering a token is that a received registration request is verified to see whether the token reference assigned to the token and/or the registration request is already known in the token reference register. If the token reference and/or the registration request are already known, the token reference is not stored. If the token reference (and the registration request) is not known, it is entered (stored) in the token reference register to be available for future use (verification and check steps) in the secure payment transaction system.

It may additionally be determined by the verification unit of the token reference register whether the received registration request as such is (syntactically) correct. The step of verifying the correctness of the received registration request is preferably performed prior to verifying the criteria in the token register.

Verifying the correctness of the received registration request, preferably comprises one or more of the following substeps:

for each input/further token reference in the received replacement registration request, the input/further token reference being assigned to an input/further token, verifying whether a signature in the registration request was created by the private key of the respective input/further token; and/or for each input/further token reference in the received replacement registration request verifying whether the hash value of the input/further token reference can be rederived from the public key included in the received replacement registration request; and/or verifying whether the received replacement registration request is value-neutral, by comparing the monetary value of (all) input token reference(s) and the monetary value of (all) output token reference(s) of the replacement registration request; and/or verifying whether the addition registration request is signed by a secure token issuing unit.

The monetary values can be e.g. compared by adding the monetary values and comparing both results (of input/output token reference(s)) or by subtracting the respective monetary value(s) (of input/output token reference(s)) and the result comparing to zero.

In the verifying step, a public key (of input token reference(s)) of the received registration request may be used to calculate the corresponding hash value for verifying whether the public key in the request corresponds to the hash value in the request and/or for verifying whether a token reference comprising the hash value is (still) stored in the token reference register (and thus can be deleted).

In one embodiment, the verifying step determines whether a signature of the registration request is correct.

The use of a token reference is not comparable to the use of addresses of subscriber entities in a blockchain-based transaction system, as no addresses of subscriber entities are used in the token reference register according to the invention to prevent traceability of the tokens.

In one embodiment, the received registration request is signed with the private key of the token-individual key pair of an input token to be able to check or verify a unique assignment of the token reference to the token. If the verification in the verifying-step is successful, i.e., the signature can be verified, then the sender of the registration request must be in possession of or must be aware of the token. This makes it possible to detect a fraud attempt with non-existent tokens or unauthorized generated tokens.

In another aspect, there is a token reference register for registering of token of an electronic payment transaction system. The token reference register may be configured to execute the method steps as described above.

In an embodiment, the token reference register may comprise one or more storage units for storing token references for registering tokens in the electronic payment transaction system. This storage unit(s) can be managed as a central database of the transaction system. The use of multiple storage units enables parallel processing of registration requests and speeds up registration in the transaction system.

In an embodiment, the token reference register may comprise one or more verification units for verifying whether the token reference of a receive registration request is stored in the token reference register. The use of multiple verification units enables parallel processing of registration requests and speeds up registration in the transaction system.

The verification unit(s) compares, for example, a command type of the received registration request with the token values of the received registration request. If a command type is expected not to add token values to or subtract token values from the transaction system, it verifies that this is met with the token values of the received token references. If verification fails, fraud is detected, and a (wrong) registration is prevented.

In an embodiment, the token reference register may comprise a new-registration unit for registering of one or more new tokens that are created by a token issuer or for registering of one or more old tokens that are deleted by the token issuer. In this new-registration unit of the token reference register, newly generated tokens and deleted tokens can be entered. With the new-registration unit, a reference value concerning the total monetary value of all valid (active) tokens located in the transaction system can be updated based on the generated and/or deleted tokens in the token reference register (for example, in a checking unit thereof). For example, if a new token is generated, its monetary value is added to the total monetary value of all valid (active) tokens. If, for example, a token is deleted, its monetary value is subtracted from the total monetary value of all valid (active) tokens.

In one embodiment, the token reference register comprises an evaluating unit for checking a sum of all monetary values in the storage unit. The token reference register stores a reference storage sum value and compares the reference storage sum value with a calculated current sum of the monetary values in the storage unit. Preferably, the reference storage sum value is changed upon addition or deletion requests. However, this value will not change upon replacement requests. As indicated above, the replacement requests are verified to be value neutral before storage.

An archive of previous registration requests could be used to verify, whether the (current) registration requests has been successfully processed (token references stored) already. In such cases where a processed registration requests is received a second or third time, it will not be processed anymore.

In one embodiment, the registration request concerns a split of a token and preferably the registration request has a token reference of the token to be split and a token reference of each of the (at least two) split tokens. The token references contained in the registration request can be concatenated. Splitting is a modification of a token, with which a monetary value of a token can be split into at least two (smaller) monetary values. This makes it possible to reduce the monetary value and to react to a transaction request more accurately to the monetary value. Thus, the origin token that is split becomes invalid and the (at least two) split tokens are registered in the token reference register to become verifiable in the transaction system.

Alternatively or additionally, splitting provides for: Generating a new private key of a token individual key pair for a first split token; applying a hash function on the private key to obtain a hash value for the first split token; generating a new private key of a token individual key pair for a second split token; applying the hash function to obtain a hash value for the second split token; splitting the monetary value into a first monetary partial value and into a second monetary partial value, taking into account that the sum of the first monetary partial value and the second monetary partial value corresponds to the monetary value of the token to be split; generating a token reference for the first split token comprising the first monetary partial value and the hash value of the first split token; generating a token reference for the second split token comprising the second monetary partial value and the hash value of the second split token; and generating the registration request using the token reference of the token to be split, the token reference for the first split token, and the token reference for the second split token.

In one embodiment, the registration request relates to a switch of a token and preferably the registration request has a token reference of the token to be switched. The switching of the token is a further modification possibility. The token references contained in the registration request may be concatenated. If a token is transferred directly from one transaction unit to another transaction unit, for example if the monetary value is to be transferred as a monetary value as part of a payment transaction, the receiving transaction unit can now have the token value re-registered to itself. This registers the switch in the token reference register.

When transferring a token between two transaction units, these two transaction units have knowledge of the same token at the same time. To prevent the sending transaction unit from also using the token with another (third) transaction unit (so-called multiple spending of tokens), a switch of the transmitted token from the first transaction unit to the second transaction unit is preferably executed. The switch can preferably be performed automatically when a token is received in the second transaction unit.

Alternatively, or additionally, the switching provides for: Generating a new private key of a token individual key pair; applying a hash function on the private key to obtain a hash value as a token reference; generating the registration request using the token reference for the token to be switched and the token reference for the switched token.

The monetary value of the token to be switched corresponds to the monetary value of the switched token. Thus, when switching, a token with the same monetary value but new private key is registered with the token reference register.

In one embodiment, the registration request concerns a merging of at least two tokens, and preferably the registration request has a token reference of the merged token and a token reference of each of the tokens to be merged. The token references contained in the registration request can be merged by concatenation. The merge is a modification possibility at a token, with which two token values are merged. This makes it possible to merge two monetary values into one monetary value in order to react to a transaction request with monetary value accuracy. Thus, both tokens to be merged become invalid and the merged token is registered in the token reference register to become checkable in the transaction system.

Alternatively or additionally, when merging, it is provided for: Generating a new private key of a token-individual key pair; applying a hash function to obtain hash value as token reference of the merged token; calculating the monetary value for the merged token by forming the sum of the respective monetary values of the at least two tokens to be merged; generating a token reference for the merged token comprising the calculated monetary value and the hash value for the merged token; and generating the registration request using each token reference of the tokens to be merged and the token reference for the merged token.

In one embodiment, a registration request is sent by a secure issuing unit, wherein the registration request concerns a creating of a token or a deletion of a token.

Each combination as named herein may be referred to as a concatenation, which is a logical combination used in information technology.

In a further aspect there is provided a secure transaction unit for managing payment transactions in an electronic payment transaction system. The secure transaction unit comprising means for receiving and transmitting one or more tokens, wherein each token comprises at least a monetary value and a private key of a token-individual key pair as token elements; and control means configured to generate one or more token references, wherein each token reference being uniquely assigned to a token, wherein each token reference comprises a hash value that is directly or indirectly derived from the private key of the token-individual key pair as a token reference element.

The control means may be configured to cause a direct exchange of one or more tokens with one or more other secure transaction units in the electronic transaction system, and send registration requests including the generated token references to a token register of the electronic transaction system for registering the tokens in the electronic payment transaction system.

The secure transaction unit may be a secure element that is operatively connected to an electronic equipment of a participant in the electronic payment system.

The secure transaction unit may be a secure wallet that is hosted at a service provider unit.

The control means may be configured to access a token storage, preferably a token storage of the secure transaction unit.

The token reference may comprises a hash value that is directly computed from the private key of the token-individual key pair as a token reference element or that is directly computed from a public key of the token-individual key pair as a token reference element, the hash value preferably being derived as a result from a SHA-512-algorithm or a SHA-256-algorithm In a further aspect, there is provided an electronic payment transaction system that comprises a secure token issuing unit that comprises a minting unit configured to generate a new token to be issued in the electronic transaction system; and a melting unit configured to delete tokens to be deleted from the electronic transaction system; a plurality of secure transaction units as described above; and one or more token register for registering the tokens of the electronic transaction system as described above.

Each secure transaction unit, e.g. a secure wallet, may comprise control means for managing one or more token of the electronic transaction system for a direct exchange of one or more token with one or more other secure wallets in the electronic transaction system, wherein the control means is configured to cause the direct exchange of the one or more token with the one or more other secure wallets in the electronic transaction system, and to send registration requests including token references to a token register of the electronic transaction system.

The secure transaction unit may comprise a token storage accessible by the control means of the secure transaction unit, preferably the control means of the secure wallet.

The secure transaction unit may comprise a token storage as a physical entity. The secure transaction unit may be configured to access the token storage. The token storage may be a token vault of this secure transaction unit. Each secure transaction unit in the transaction system may comprise its own token storage.

From such token storage accessible by the secure transaction unit, each token can be transferred to any other secure transaction unit, e.g., owned by a customer of the secure transaction unit.

The secure transaction unit may be a secure wallet that may be a hardware security module built in hardware or software to enable tamperproof and secure access to the In a further aspect, a non-transitory computer readable storage medium for tangibly storing computer program instructions capable of being executed by a processor is described. The computer program instructions defining the steps the method as described above.

Each token comprises a monetary value as a first token element. The monetary value may be a data that represents money usable in one or more electronic payment transaction.

Each token further comprises a private key as a second token element. The private key may be referred to as a blinding value (e.g. obfuscation amount) or may be a random number or may be a secret that is not known to participants not involved in a transaction. The private key may be a private key of a token-individual key pair.

In addition, each token may have further token elements as outlined below and may also have further token elements such as further metadata, e.g., currency data that indicates the currency which the monetary amount represents and/or validity data and/or timestamp data.

The token may also be referred to as value note within this disclosure. The token can be used in online and offline payment transactions. The token may represent central bank digital currency, CBDC.

The token may comprise one or more token-individual history entries as a further token element. One history entry may represent one modification, such as SWITCH, SPLIT, MERGE, performed with this token. History entries may be replacement registration requests. Such a further token element may also be referred to as history data.

It is possible to use tokens exclusively in offline electronic payment transactions between two directly communicating secure token managing units (e.g., secure elements) within the electronic payment transaction system.

An online electronic payment transaction payment is defined herein as a transaction in which a secure wallet (e.g. in a secure element) that participates in the transaction, e.g. the secure wallet that initiates the token transfer (payer) or the secure wallet that receives a token (payee), has access and can communicate with one or more remote instances of the electronic payment system, such as a token register, a transaction register, a token issuing unit, a service provider unit such as financial service provider (FSP) via classical internet or mobile communication means or any other suitable online communication protocol. So, immediately before, while or after performing the transaction, also a registration of the transaction by storing a respective token reference in a remote token register is performed by one of the secure wallets involved in the transaction.

An offline electronic payment transaction payment is defined herein as a direct transaction between two secure wallets (e.g. residing in secure elements) that participate in the transaction, e.g. the secure wallet that initiates the token transfer (payer) and/or the secure wallet that receives a token (payee). At least one of payer or payee has no access and cannot communicate with remote instances of the transaction system, such as a token register, a transaction register, a token issuing unit and/or a service provider unit, such as financial service provider (FSP) via classical internet or mobile communication means. The token transfer may then take place by local wireless communication means, such as Bluetooth, NFC, or any other suitable wireless communication protocol. The token transfer may also take place by contact-based communication means, such as USB, ISO 7816, or any other suitable contact-based communication protocol.

For a registration of a token in the token register, a token reference of the token may be generated. Each token reference comprises a hash value as a token reference element and may further have the monetary value of the token as another token reference element.

A token "managed by" a token transaction unit, such as the above described secure wallets, is a token that resides in a memory (storage) space. The memory space can be an internal memory space of the token management unit, or it can be an external memory space to which the token management unit has exclusive access rights. This memory space can include a remote memory space, such as a cloud memory (storage) space.

Implementation of modifications to tokens can be performed with the known payment transactions of WO 2020/212 337 A1; WO 2020/212 331 A1; WO 2021/170 646 A1 and WO 2021/170 645 A1 protocols.

A corresponding token reference is associated with each token in the method and payment transaction system. Knowledge of a token reference does not authorize issuing of the digital money represented by the token. This represents a key difference between token references and tokens. A token reference is unique and also uniquely associated with one token, so there is a 1-to-1 relationship between the token and the token reference. The token reference can be computed by each participant, such as a secure wallet (e.g. in a secure element) of a participant in the electronic payment system. The computing is preferably performed by the control means.

In the following, the invention or further embodiments and advantages of the invention are explained in more detail based on drawings, wherein the drawings describe only embodiments of the invention. Identical components in the drawings are given the same reference signs. Elements drawn with dashed lines are considered as optional elements.

BRIEF DESCRIPTION OF THE DRAWINGS

The drawings are not to be regarded as true to scale, and individual elements of the drawings may be shown in exaggeratedly large or exaggeratedly simplified form.

FIG. 4a shows an overview of commands for tokens according to the invention.

FIG. 4b shows an overview of signed registration requests for the commands according to the invention.

FIG. 7 shows an exemplary embodiment of a flowchart of a method according to the invention for splitting and registering a token and an overview of the command details depending on the transaction layer.

DETAILED DESCRIPTION OF THE INVENTION

Figure 1:
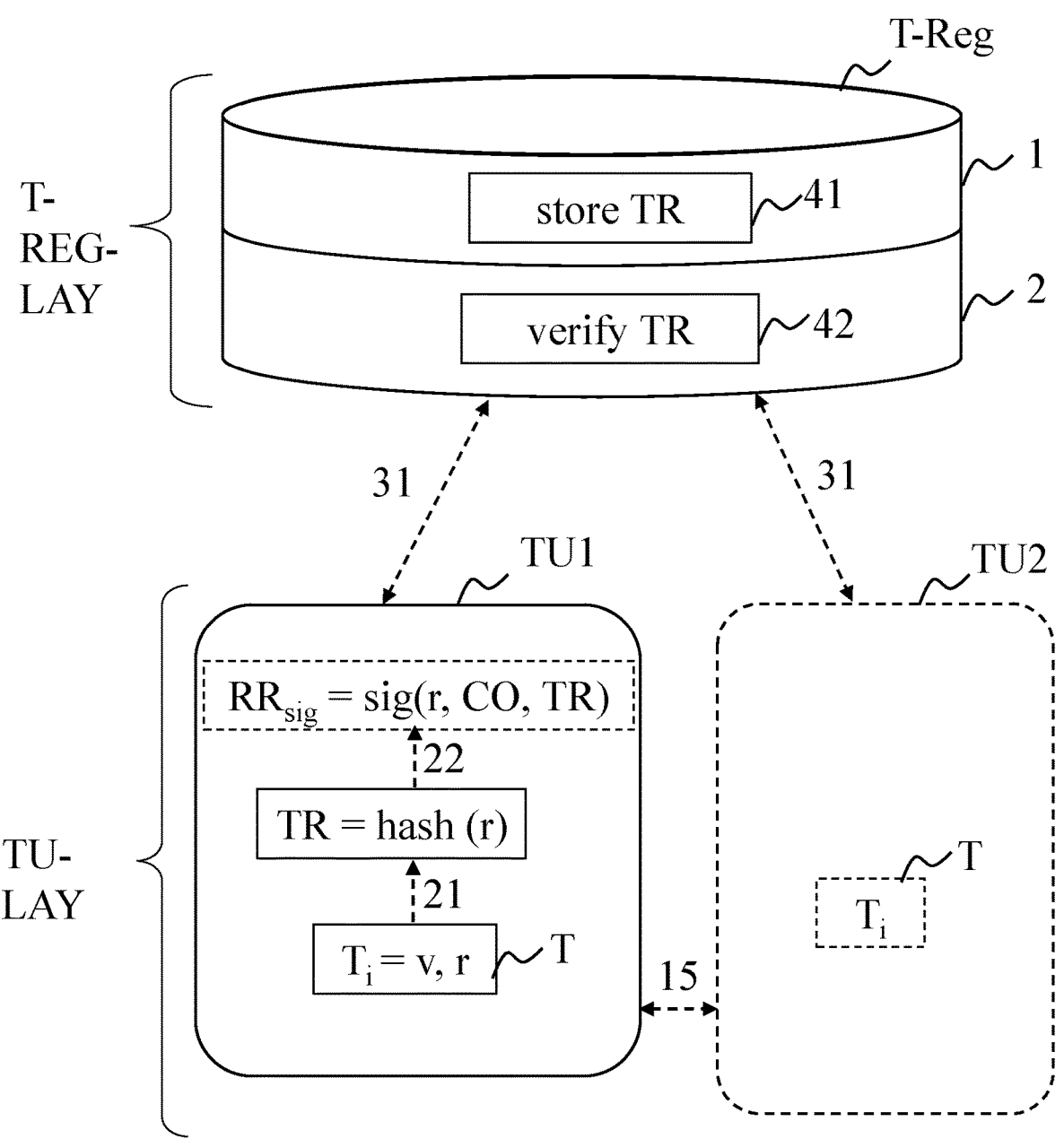
FIG. 1 shows an exemplary embodiment of a secure electronic payment transaction system for token transactions according to the invention.

FIG. 1 shows an embodiment example of a secure electronic payment transaction system TS according to the invention. The transaction system TS comprises a register layer T-REG-LAY in which a token reference register T-Reg is arranged. The TS further comprises a direct transaction layer TU-LAY in which a plurality of transaction units TU may be provided, as an example, two transaction units TU1 and TU2 are shown.

The transaction units TU of the transaction system TS are arranged to exchange 15 tokens T directly with each other. In the case of FIG. 1, the tokens T are payment tokens, which are also referred to as digital coins. Each token T is generated by a transaction unit TUI of a token issuer (not shown in FIG. 1, but see FIG. 3). Each token T can be split, merged or switched by each transaction unit TU (see FIGS. 7 to 9) and can be generated by a transaction unit TUI of a token issuer (see FIG. 5) and also deleted (see FIG. 6). A transaction unit TUI of a token issuer is, for example, a central bank.

A token T is uniquely represented by a monetary value v and a random number r as token elements v, r in the transaction system TS. The monetary value v can be specified in a range of values from 1 to $2^{31}-1$. The random number r may be a number in the range of 0 to $2^{256}-1$, i.e., the order of an elliptic curve, for example secp256r1.

Here, the random number r is a private key of a token-individual key pair. The random number r is unique and secret in the transaction system TS and may not be published or reused. The generation of the random number r must be unpredictable.

For example, the token value v is a 32-bit token element of type integer. For example, the random number r is a 32 byte token element of type integer. A transaction units TU has exclusive access to a storage unit (vault) or includes this token memory in a data store of the transaction units TU.

A token T may be stored as a TLV encoded record in a token store and then has a unique tag and length information, for example, in the following format.

For each token T, a token reference TR can be stored in the token reference register T-Reg. The token reference TR comprises a hash value directly derived 21 from the private key r of the token-individual key pair. The token reference TR of the token T can be viewed at any time in the register T-Reg of the transaction system TS.

This token reference TR can be sent 31 to the token reference register T-Reg as a registration request RR (being generated in step 22), if necessary, together with a command (see overview in FIGS. 4a and 4b) regarding the token T.

Additionally, the registration request RR can be signed with the private key r. Signing makes it possible to verify that the sender of the token reference TR was in possession of the token T, further enhancing security in the transaction system TS.

In the transaction unit TU, the signed registration request RR_sig is stored as a so-called PROOF.

This registration request RR can be sent 31 to the token reference register T-Reg. This registration request RR is received in the token reference register T-Reg. After the registration request RR has been checked by the token reference register T-Reg, the token reference TR is stored in the token reference register T-Reg, whereby the token T is registered in the transaction system TS.

This token reference TR is uniquely assigned to the token T and is used to register the token T in the transaction system TS. The token reference TR is therefore the public representation of the token T from the direct transaction layer TU-LAY. Sole knowledge or possession of the token reference TR alone does not allow the token T to be transferred and is not equivalent to the TU being in possession of the token T. The token reference TR is used to prevent multiple spending attempts and checks whether token values v have been generated in an improper manner. Therefore, the token reference TR and, if applicable, the history about the tokens T and the corresponding registration requests RR from TU(s) are stored in the token reference register T-Reg.

The tokens T are stored, for example, in a secure wallets, as the TU. These wallets are, for example, software applications within a terminal device in which the TU is operationally embedded. A wallet may be set up as an application on a smartphone, smart card or payment terminal. The wallet is used to securely manage tokens T of the TU, generate token references TR, modify tokens T, and/or exchange tokens T. Wallets are used to communicate with the token reference register T-Reg, generate registration requests RR to the token reference register T-Reg, and/or perform transaction of token T to another TU.

A transaction with a TU does not require a communication link to the token reference register T-Reg of the transaction system TS. The transaction system TS is set up to perform a transaction offline, i.e., without a communication link to the token reference register TRR. A corresponding registration of token T may therefore be temporally downstream of a transfer of token T to a TU.

The token reference register T-Reg is a unit of the transaction system TS and is either a central register or database of the transaction system TS or a decentralized register or database (DLT) of the transaction system TS.

Figure 2:
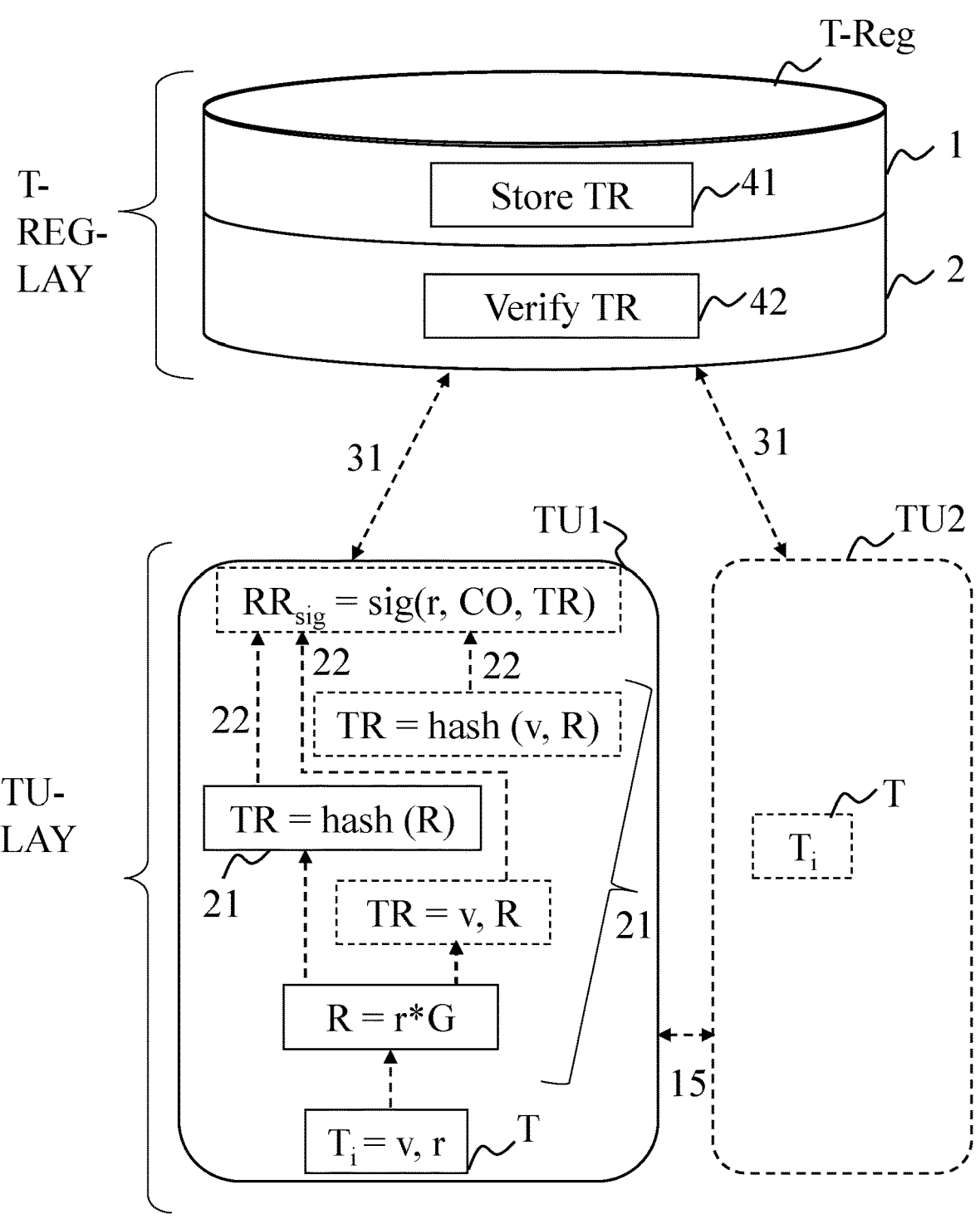
FIG. 2 shows another exemplary embodiment of a secure electronic payment transaction system for token transactions according to the invention.

In FIG. 2, another exemplary payment transaction system TS is shown. The difference to FIG. 1 is merely shown in TU1, in which there is a plurality of alternatives to generate a TR from a T.

Here, the hash value for the TR is indirectly derived from the private key r, namely by computing a public key R, first. So, the token reference TR comprises a hash value of a public part R of the token-individual key pair.

The public part R of the token individual key pair is generated by applying a cryptographic function to the private part r of the token individual key pair. This function is difficult to reverse and thus provides the transaction system TS with the required security. It holds that R=r*G, where G can be, for example, a global parameter of the transaction system TS, e.g., a generator point of an elliptic curve, here the secp256r1 curve. However, this ECC algorithm is not considered as quantum safe and so, the revealing of R should be avoided. Thus, the TR is built with a hash value that is directly derived from R (and so, indirectly from r) so that a assignment between TR and T is obtained.

The token reference TR can alternatively formed 21 by a hash value of a token value v of the token T and the public part R of the key pair.

Shown in dashed line is a token reference TR that is a concatenation or linkage of the token value v and the public part R (conventional TR).

Similar to FIG. 1, the token reference TR can be sent 31 to the token reference register T-Reg as a registration request RR, if necessary, together with a command (see overview in FIGS. 4a and 4b) regarding the token T.

Figure 3:
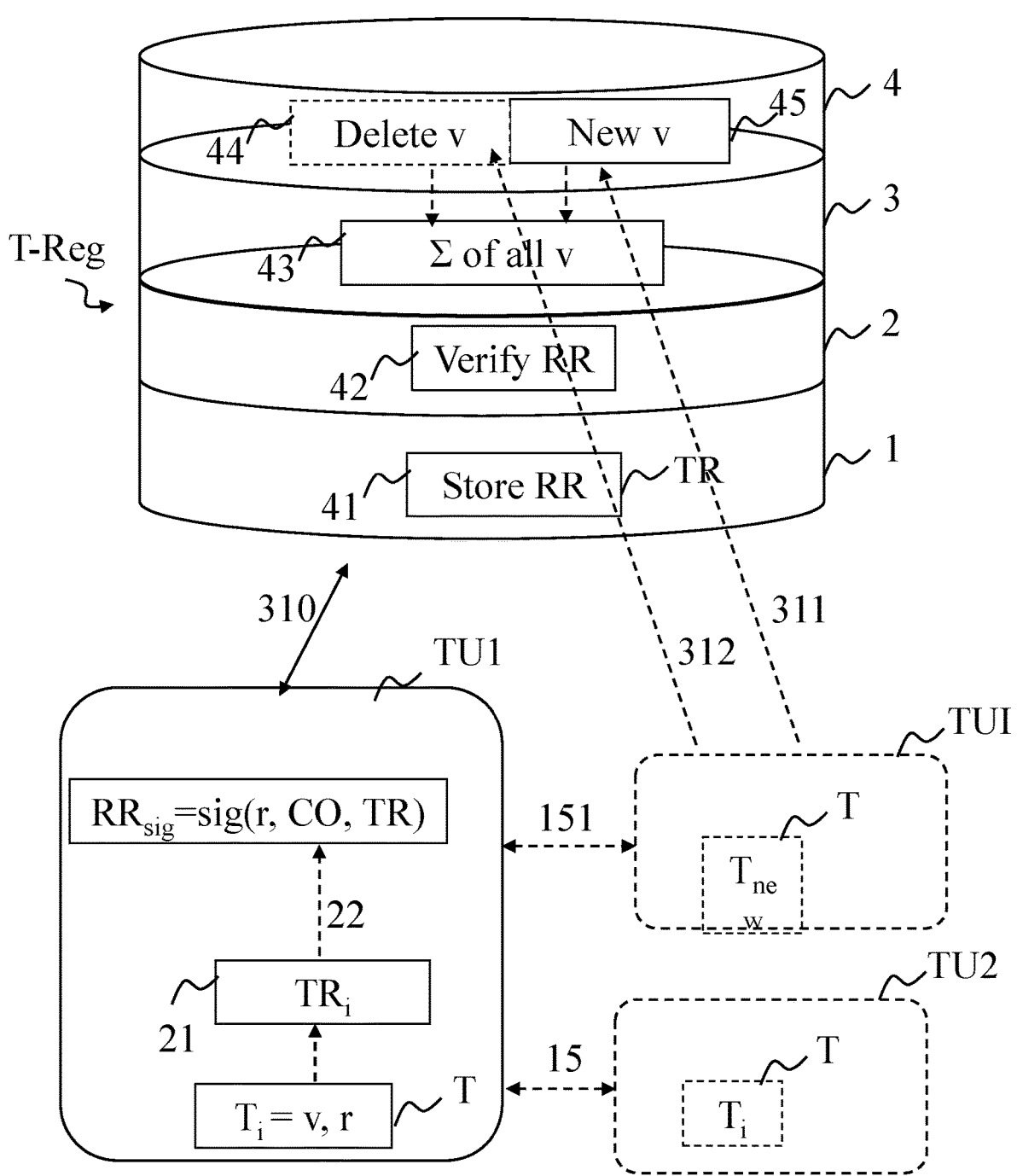
FIG. 3 shows another exemplary embodiment of a secure electronic payment transaction system for token transactions according to the invention.

FIG. 3 shows another exemplary embodiment of a token reference register T-Reg of the invention.

In particular, the token reference register T-Reg manages the storage location for the token references TR, shown here as database 1 as an example of a storage unit in the token reference register T-Reg. As a representative example, the TR for the token T of the TU1 is entered in the database 1 upon replacement request 310. This database 1 may consist of an association of many databases (see also FIG. 10) which are interconnected.

In addition, the token reference register T-Reg may include at least one verification unit 2. The verification unit 2 of the token reference register T-Reg verifies registration requests RR. Thereby, a syntactical correctness or also the correct specification of a command in the registration request RR can be verified. Also a history from old (past) registration requests RR concerning a token T can be verified. The separation of this verification unit 2 from the database 1 distributes the tasks of filing and checking and increases the speed in the token reference register T-Reg.

In addition, the token reference register T-Reg may include an evaluating unit 3 (checking unit) that checks whether a total monetary value X in the storage unit, accordingly in transaction system TS, is unchanged. It compares the current total monetary value with a reference total value. The reference total value is changed only, if add/delete requests from a token issuer is received. Only privileged entities, such as an issuer TUI, are allowed to do this in the transaction system TS. If a change of the total sum of monetary values is detected, then a fraud case can be assumed.

The verification of the total monetary value by the evaluating unit 3 represents another security concept in the transaction system TS.

In addition, the token reference register T-Reg may include a new-registration unit 4 in which newly generated token references TR of a token issuer TUI are first-registered (creation request 311) or token references TR to be deleted are de-registered deletion (request 312). This achieves a separation of functions between token references TR of privileged participants, such as a token issuer TUI, from token references TR of unprivileged participants, such as the TU. The monetary values v of newly generated token references TR or token references TR to be deleted directly affect a change in the total monetary value monitored in the evaluating unit 3.

A registration request RR, e.g. 310, 311, 312, is preferably signed with the private part r. The signature allows a syntactic authenticity of the command to be easily checked by the receiver (T-Reg or TU). This verification is preferably performed in the database 1 or the verification unit 2. Furthermore, a register request RR can be syntactically validated, for example, by checking the signature and/or the token reference TR.

Even though a signature may be checked in a TU, this does not ensure that multiple issuances of the same token T have not been attempted. Therefore, registration in the token reference register T-Reg is provided. In addition, a secure hardware platform is maintained by the TU. With available connection to the token reference register T-Reg, the token references TR are transmitted, and the multiple issuance attempt can be detected in the token reference register T-Reg.

If a token reference TR is not yet known in the token reference register T-Reg, it is added.

In FIG. 4a an overview of commands CO is shown, which can be executed at a token T. The commands CO can be modifications of an existing token T, for example "switch", "split" or "merge" that are used in replacement requests 310. The commands CO can also concern the creation (=create) of a token T that is used in a creation request 311 or the deletion (=Destroy) of existing tokens T that is used in a deletion request 312. In FIG. 4a command codes are given as examples (0x01 to 0x05), which can then be part of a registration request RR.

FIG. 4b shows an overview of commands CO and their signed registration request syntax RR. Input tokens T and input token references TR are "consumed" per command CO. Thereby output tokens T output token references TR are "generated" per command CO.

A command CO has the basic structure of the following three elements: Command type, input token reference(s), output token reference(s).

Each command has a characteristic number of input token reference(s) ("inputs") and output token reference(s) ("outputs"), which are explained and illustrated in more detail in FIGS. 5 to 9.

It should be noted that for the CO "split", "switch" and "connect" commands, the difference of the token values v of all involved tokens T or token references TR must equal "zero". In other words, these CO "Split", "Switch" and "Connect" commands do not generate any token values v and do not destroy any token values v. This can be verified at the command type CO itself or also by the evaluating unit 3 of the token reference register T-Reg and is a check criterion for a register request RR.

It should also be noted that only for the commands CO "Create" and "Delete" a difference of the token values v of the involved token T or token references TR is allowed, but only in the amount of the token value v of the token T and not beyond.

Each registration request 31 can be signed to be able to verify that the sender of the token reference TR is also in possession of the associated token T. An ECDSA scheme can be applied as signature. The registration request RR is preferably signed with the private part r of the token T.

For signed registration requests of the command types CO "Create" and "Delete", a further signature of a transaction unit of token issuer TUI is required to ensure that these commands have been generated by a privileged entity of the transaction system TS.

Figure 5:
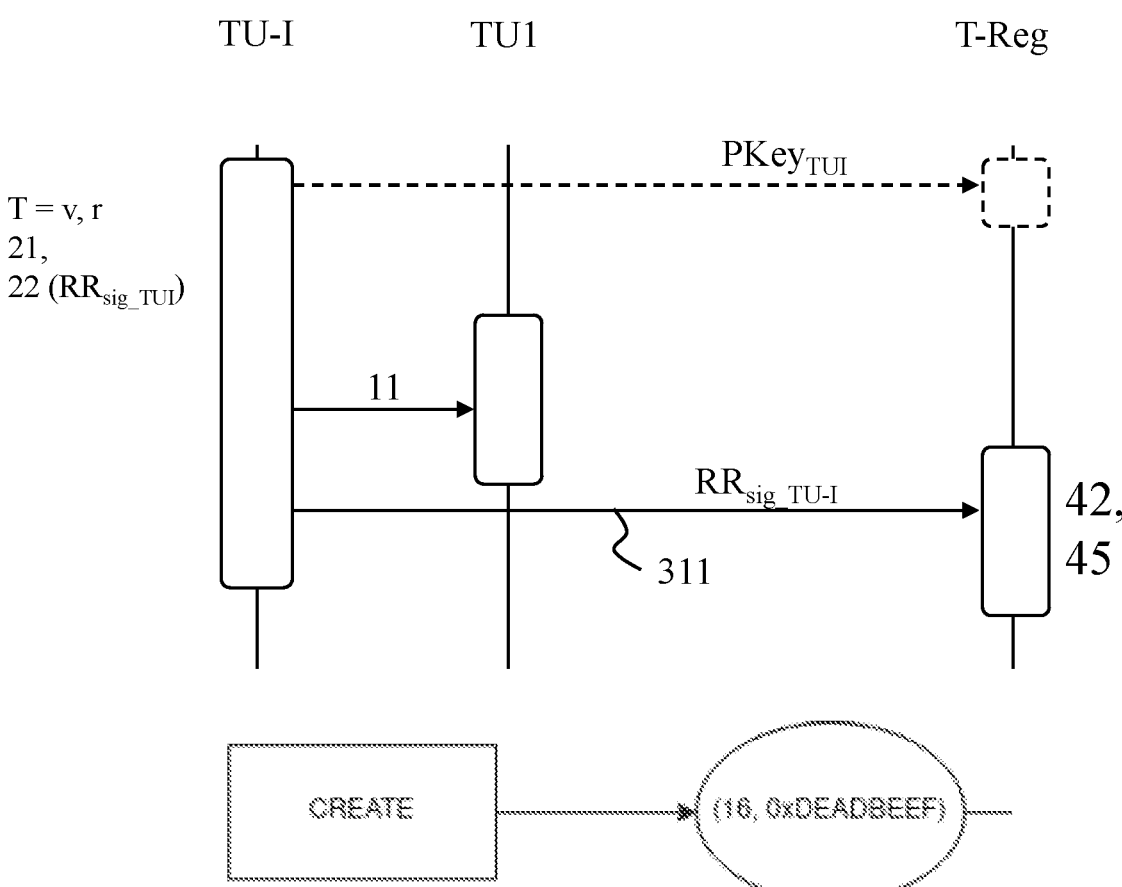
FIG. 5 shows an exemplary embodiment of a flowchart of a method according to the invention for creating and registering a token and an overview of the command details depending on the transaction layer.

FIG. 5 shows an example of a flowchart of a method according to the invention for creating a token T and registering the token T with a creation request 311 in the T-Reg. In addition, the signed registration request RRsig and the command structure are tabulated from the viewpoint of both the TU-LAY and the T-Reg-LAY.

When creating, there is no input parameter in the TU-LAY. A random number r is generated in a privileged unit, here the token issuer TUI. Based on the random number r, a public part R may be calculated (the conventional way to establish TR). In step 21, a hash value is directly or indirectly derived from the private key r to generate TR. Based on TR, the RR is generated in step 22 as outlined in FIG. 5.

According to step 22, the registration request RR consisting of the command "CREATE" or the code according to FIG. 4a and the generated token reference TR is signed in the TUI. The private key $pKey_{TUI}$ of the TUI is used for this purpose.

In the TU-LAY, the token T is issued to the TU1. In the T-Reg-LAY, the signed registration request $RR_{sig}$ is issued to the T-Reg.

In the token reference register T-Reg, the signature of the registration request RR is verified 42 with the public key PKey of TUI. This public key $PKey_{TUI}$ is known throughout the transaction system TS or was made available to the token reference register T-Reg in advance. If the signature check is successful, then the token reference TR is stored 45 into the token reference register T-Reg.

In one embodiment, the total monetary value of the transaction system TS in the evaluating unit 3 of the token reference register T-Reg is increased by the token value v by the new-registration unit 4 of the token reference register T-Reg.

Figure 6:
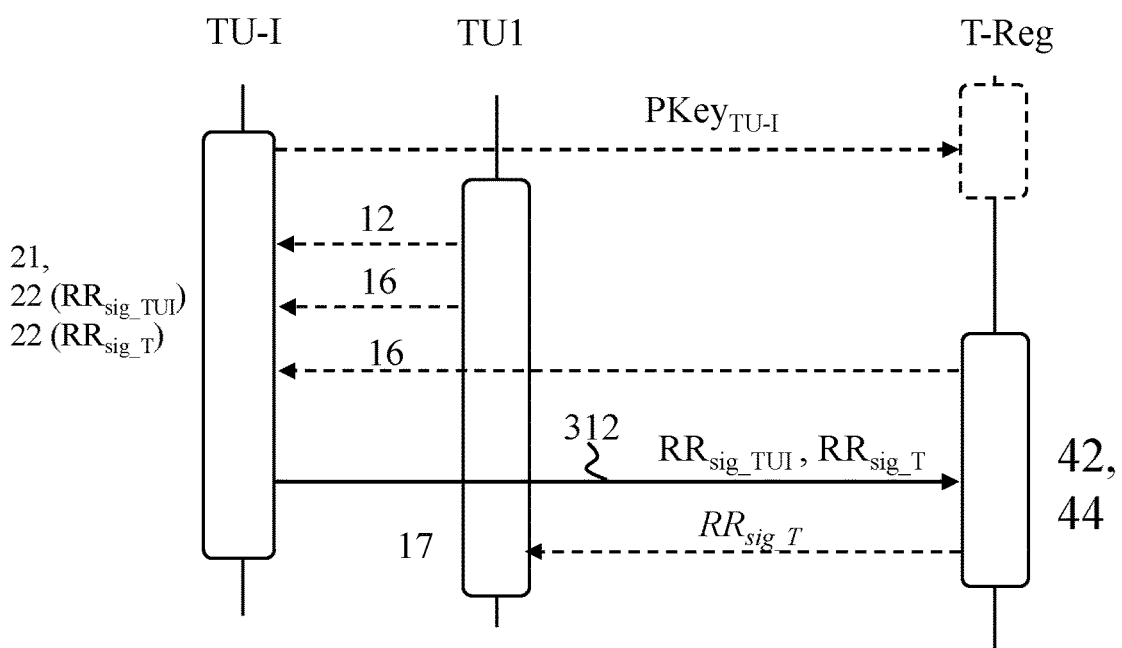
FIG. 6 shows an exemplary embodiment of a flowchart of a method according to the invention for deleting a token and registering a token and an overview of the command details depending on the transaction layer.

FIG. 6 shows an example of a flowchart of a method according to the invention for deleting a token T and registering 44 the deleted T in the T-Reg. In addition, the signed registration requests $RR_{sig}$_TUI and $RR_{sig\_T}$ required for this as well as the command structure are shown in tabular form from the point of view of both the TU-LAY and the T-Reg-LAY.

When deleting 44, the token T to be deleted is used as input parameter in the TU-LAY and the token reference T-Reg to be deleted and two signed registration request $RA_{sig\_TUI}$ and $RA_{sig\_T}$ are used in the T-Reg-LAY.

The registration request RR consisting of the command "DESTROY" and the token reference TR to be deleted is signed once with the private key pKey of the TUI.

Another registration request RR consisting of the command "DESTROY" and the token reference TR to be deleted is also signed with the private part r of the token T.

Both signed registration requests RR are sent to the token reference register T-Reg as destruction request 312. In the token reference register T-Reg, the signature is verified 42 with the public key of the TUI. This public key is known throughout the transaction system TS or was made available to the token reference register T-REg in advance. In addition, the signature of the further registration request RR is checked with the public part of the token reference TR. If both signature checks are successful, then the token reference TR is deleted 44 or marked as deleted in the TRR.

In one embodiment, the total monetary value of the transaction system TS in the evaluating unit 3 of the token reference register T-Reg is reduced by the monetary value v by the new-registration unit 4 of the token reference register T-Reg.

The token reference register T-Reg or the TUI also causes the token T in the TU1 to be deleted.

FIG. 7 shows an example of a flowchart of a method according to the invention for splitting a token $T_a$ and registering the split tokens $T_b$ $T_c$ in the token reference register TRR using a replacement request 310. In addition, the signed registration request $RR_{sig\_Tn}$ required for this purpose is tabulated, as well as the command structure from the point of view of both the TU-LAY and the T-Reg-LAY.

In the TU-LAY, a first random number $r_b$ and a second random number $r_c$ are generated by TU1. Based on this, hash values are generated respectively. The token $T_a$ to be split is available as input parameter in the TU-LAY. In the TU-LAY, the token value $v_a$ is divided into a first monetary partial value $v_b$ and a second monetary partial value $v_e$. The sum of monetary partial value $v_b$ and monetary partial value $v_e$ must result in the token value $v_a$. This ensures that no new token value v is generated or that a token value v is destroyed.

Based on the hash values, the TU1 generates in step 21 the token references $TR_b$ and $TR_c$. The registration request RR is generated in step 22 and contains the command "SPLIT" or the command code shown in FIG. 4a, the input token reference $TR_a$ and the output token references $TR_b$ and $TR_c$. This registration request RR is signed with the random number $r_a$ of the token $T_a$. The signed registration request $RR_{sig\_Ta}$ is sent as a replacement request 310 from TU1 to the token reference register T-Reg. There, the signature is checked in step 42 and the sum of $v_b$ and $v_e$ is formed and compared with the token value $v_a$. If $v_a=v_b+v_e$ holds and the signature check is successful in step 42, then the token reference $TR_a$ is deleted in step 44 or marked as deleted in the token reference register T-Reg and the token references $TR_b$ and $TR_c$ are entered in step 41 in the token reference register T-Reg.

In one embodiment, the monetary value difference of the input token reference $TR_a$ and the output token references $TR_b$ and $TR_c$ (if present in the respective TR) is formed in the token reference register T-Reg in the verification unit 2 and it is checked in step 42 whether this difference is zero. If the difference is not zero, a monetary value v has been generated or destroyed in an unauthorized manner. In addition, the total monetary value of the transaction system TS can also be checked in the evaluating unit 3 of the token reference register T-Reg before or after the registration of the token references $TR_b$ and $TR_c$. The total monetary value v in evaluating unit 3 must not have changed and must be the same as the value before the registration request was processed in the token reference register T-Reg.

The split token $T_b$ (or $T_c$) (which has been transferred in step 15 from TU1 to TU2 in the meantime) can now be checked for validity by the TU2 in T-Reg.

Figure 8:
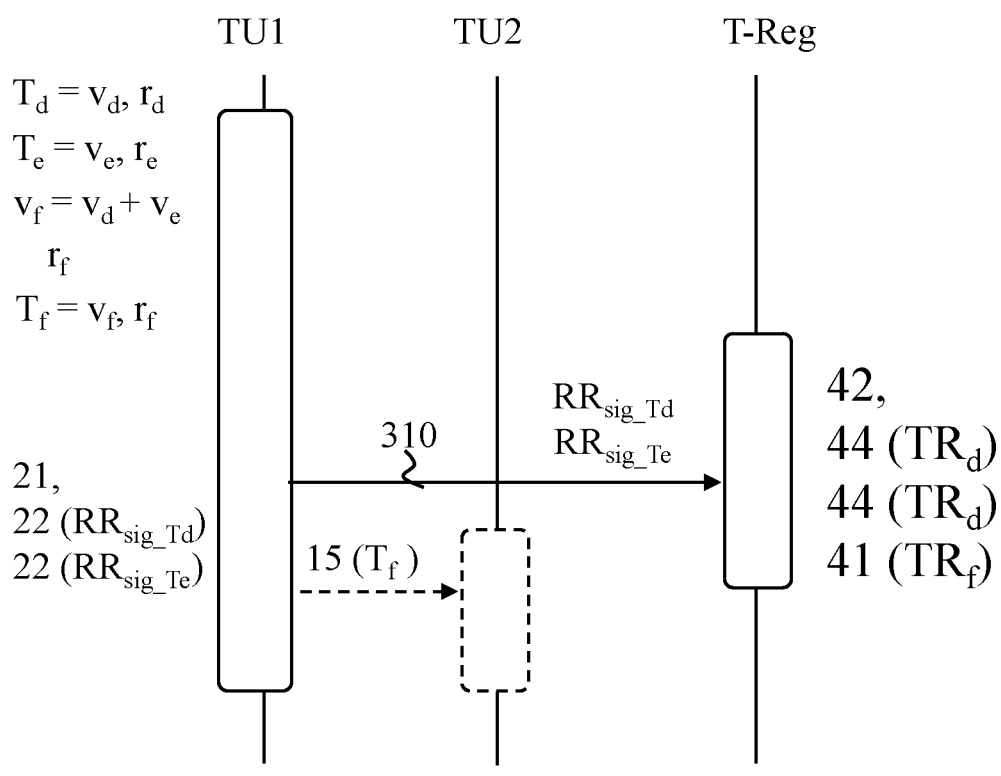
FIG. 8 shows an exemplary embodiment of a flowchart of a method according to the invention for merging and registering a token and an overview of the command details depending on the transaction layer.

FIG. 8 shows an example of a flowchart of a method according to the invention for merging a token Td with a token $T_e$ and registering the connected token $T_f$ in the T-Reg. In addition, the signed registration requests $RR_{sig\_Td}$ and $RR_{sig\_Te}$ required for this purpose as well as the command structure are shown in tabular form from the point of view of both the TU-LAY and the T-Reg-LAY.

Here, a random number $r_f$ is generated in a TU1 of the TU-LAY. Based on this, a hash value is generated. In addition, a sum of the monetary values $v_d$ and $v_e$ is formed to the monetary value $v_f$ based on the input tokens $T_d$ and $T_e$.

Then the output token reference $TR_f$ is generated in step 21. A registration request RR then contains the command "MERGE" or the command code listed in FIG. 4a, the two input token references $TR_d$ and $TR_e$, and the output token reference $TR_f$. This registration request RR is signed once with the random number $r_d$ of the token $T_d$ to obtain a first signed registration request $RR_{sig\_Td}$. This registration request is also signed with the random number $r_e$ of the token $T_e$ to obtain a second signed registration request $RA_{sig\_Te}$ in step 22. Both signed registration requests $RA_{sig\_Td}$ and $RA_{sig\_Te}$ are sent as replacement request 310 from TU1 to the token reference register T-REg. There, the signatures of the registration requests $RA_{sig\_Td}$ and $RA_{sig\_Te}$ are checked in step 42 respectively. In addition, the sum of the token values $v_d$ and $y_e$ is formed and compared with the token value $v_f$. If $v_f=v_d+v_e$ holds and both signature checks are successful in step 21, then $TR_d$ and $TR_e$ are deleted in step 44 or marked as deleted in the token reference register T-Reg and the token reference $TR_f$ is entered in step 41 in the token reference register T-Reg. The associated token $T_f$ (which has been transferred in step 15 from TU1 to TU2 in the meantime) can now be checked for validity by the TU2 in T-Reg.

Figure 9:
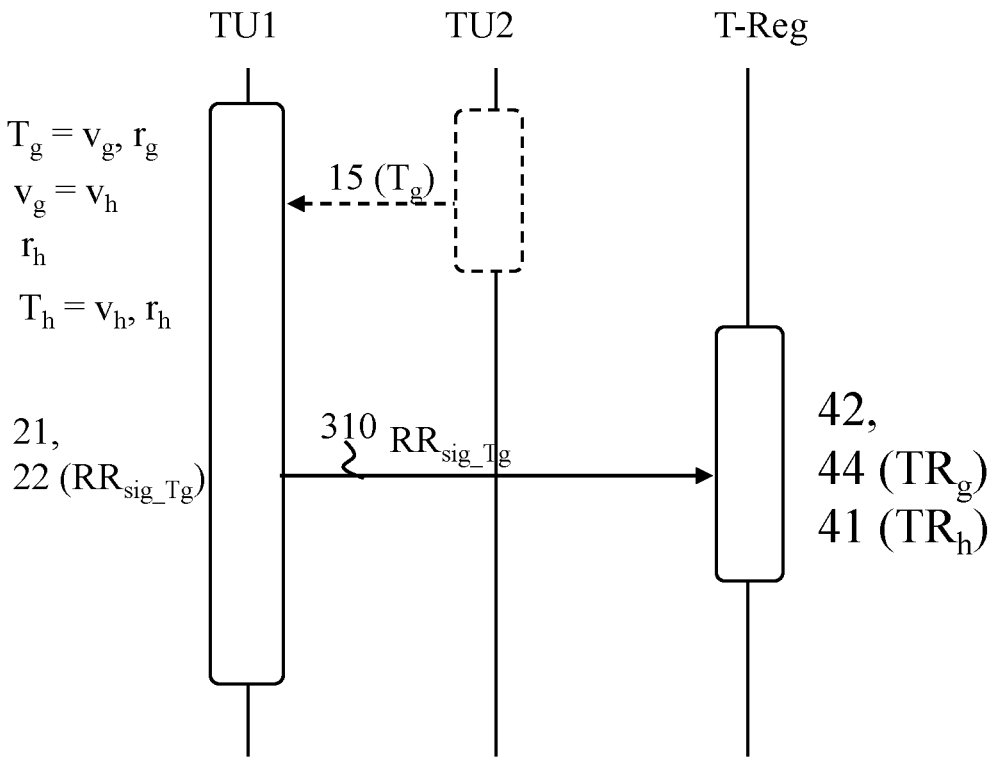
FIG. 9 shows an exemplary embodiment of a flowchart of a method according to the invention for switching and registering a token and an overview of the command details depending on the transaction layer.

FIG. 9 shows an example of a flowchart of a method according to the invention for switching a token $T_g$ to a token $T_h$ and registering the switched token $T_h$ in the token reference register T-Reg. In addition, the signed registration request $RA_{sig\_Tg}$ required for this purpose is tabulated, as well as the command structure from the point of view of both the TU-LAY and the T-Reg-LAY.

A random number $r_h$ is generated in a TU1. Based on this, a hash value is derived. In addition, the token value $v_h$, which is identical to the token value $v_g$ of the input token $T_g$, is formed.

Then the token reference $TR_h$ is generated in step 21. A registration request RR then contains the command "SWITCH" or a corresponding friendly code according to FIG. 4a, the input token reference $TR_g$ and the hash value (directly or indirectly) derived from $r_h$. This registration request RR is signed with the random number $r_g$ of the token $T_g$. The signed registration request $RA_{sig\_Tg}$ is sent as replacement request 310 by the TU1 to the token reference register T-Reg. There the signature is checked in step 42. In addition, the token value $v_g$ is compared with the token value $v_h$. If $v_g = v_h$ applies and the signature check is successful in step 42, then the token reference $TR_g$ is deleted in step 44 or marked as deleted in the token reference register T-Reg and the token reference $TR_h$ is entered in step 41 in the token reference register T-Reg.

Figure 10:
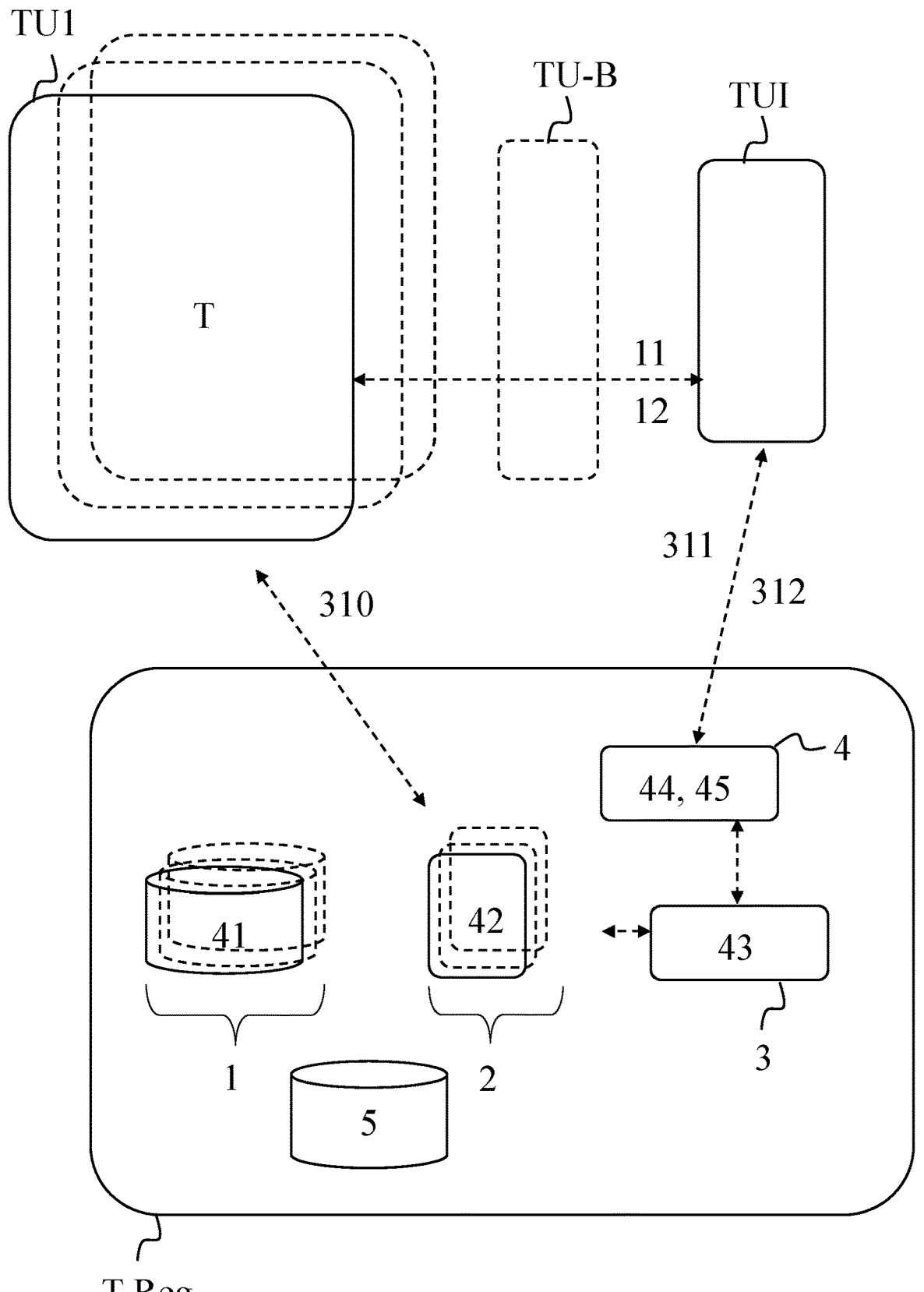
FIG. 10 shows another embodiment example of a token reference register according to the invention.

FIG. 10 shows another embodiment of a token reference register T-Reg of a transaction system TS.

In FIG. 10, it is indicated that a plurality of storage units 1 may be provided in the token reference register T-Reg to accelerate the storing 41 of a plurality of token references TR. Here, it is further indicated that a plurality of verification units 2 may be provided in the token reference register T-Reg to accelerate the verifying 42 of registration requests RR. In addition, a transaction unit of a bank instance TU-B is shown that functions as an interface between the transaction system TS and a book money system (credit allocation, account management) and enables TUs to transfer tokens T of the transaction system TS to another transaction system TS. This transfer is bidirectional and takes place using the token issuer TUI, which is solely responsible for generating tokens T and also for deleting tokens T.

The invention claimed is:

1. A method for registering a token of an electronic payment transaction system, wherein each token comprises at least a monetary value and a private key of a token-individual key pair as token elements, the method comprising the steps of:

receiving, at a token reference register of the electronic payment transaction system, a registration request, the registration request being an addition registration request requesting addition of at least one token reference to be stored in the token reference register or a replacement registration request requesting replacement of at least one token reference to be stored in the token reference register for at least one token reference to be replaced in the token reference register, wherein the at least one token reference to be stored is an output token reference and the at least one token reference to be replaced is an input token reference, the registration request comprising at least one token reference, wherein each token reference is uniquely assigned to a token, wherein each token reference comprises a hash value as a token reference element that is directly or indirectly derived from the private key of the token-individual key pair or directly derived from a public key of the token-individual key pair, wherein each output token reference does not comprise the public key, and wherein each input token reference comprises the public key;

verifying, by a verification unit of the token reference register, whether at least one criteria in the token reference register is met for the received registration request; and storing, in a storage unit of the token reference register, the output token reference of the received registration request for registering the token uniquely assigned to this token reference, in case the at least one criteria is met for the received registration request.

2. The method according to claim 1, wherein the at least one token reference comprises a hash value that is directly computed from a public key of the token-individual key pair as the token reference element; or the at least one token reference comprises a hash value that is directly computed from the private key of the token-individual key pair as the token reference element.

3. The method according to claim 1, wherein the hash value is derived as a result from a SHA-512-algorithm or a SHA-256-algorithm.

4. The method according to claim 1, wherein the token reference further comprises the monetary value of the uniquely assigned token.

5. The method according to claim 1, wherein the addition request is received from a secure token issuing unit of a token issuer of the transaction system, requesting the addition of a token reference of a new token to the token reference register; or the replacement registration request is received from a transaction unit of the transaction system, requesting at least one input token reference, m input token references stored in the token reference register to be replaced in the token reference register by n output token references.

6. The method according to claim 1, wherein the step of verifying comprises:

verifying whether the output token reference of the received registration request is not already stored in the storage unit of the token reference register; and/or verifying whether the input token reference(s) of the received registration request is stored in the storage unit of the token reference register; and/or verifying whether the received registration request is not already stored in an archive of previous registration requests in the token reference register.

7. The method according to claim 1, wherein the verification unit further verifies the correctness of the received registration request, by performing one or more of the following substeps:

for each input token reference in the received replacement registration request, the input token reference being assigned to an input token, verifying whether a signature in the registration request was created by the private key of the respective input token; and/or for each input/further token reference in the received replacement registration request verifying whether the hash value of the input token reference can be rederived from the public key included in the received replacement registration request; and/or verifying whether the received replacement registration request is value-neutral, by comparing the monetary value of (all) input token reference(s) and the monetary value of (all) output token reference(s) of the replacement registration request; and/or verifying whether the addition registration request is signed by a secure token issuing unit.

8. A token reference register for registering of token of an electronic payment transaction system, the token reference register comprising at least one processor, a memory storing a token reference database, and a communication interface configured to receive the registration request, wherein the at least one processor is configured to execute the method steps of claim 1.

9. The token reference register of claim 8, wherein the at least one processor is configured to execute a verification module for performing the verifying step for the received registration request, and a new-registration module for registering of one or more new tokens that are created by a token issuer or for deregistering of one or more old tokens that are deleted by the token issuer, and wherein the memory further stores an archive of previous registration requests.

10. A secure transaction unit for managing payment transactions in an electronic payment transaction system, the secure transaction unit comprising:

a communication interface configured to receive and transmit one or more tokens, wherein each token comprises at least a monetary value and a private key of a token-individual key pair as token elements; and at least one processor and a secure memory storing instructions that, when executed by the at least one processor, cause the secure transaction unit to generate one or more token references, wherein each token reference is uniquely assigned to a token and wherein each token reference comprises a hash value as a token reference element that is directly or indirectly derived from a private key of a token-individual key pair or directly derived from a public key of the token-individual key pair, wherein each output token reference of the one or more token references does not comprise the public key, and wherein each input token reference of the one or more token references comprises the public key.

11. The secure transaction unit of claim 10, wherein the at least one processor is configured to cause a direct exchange of one or more tokens with one or more other secure transaction units in the electronic transaction system, and send registration requests including the generated token references to a token reference register of the electronic transaction system for registering the tokens in the electronic payment transaction system.

12. The secure transaction unit according to claim 10, wherein the secure transaction unit is a secure element that is operatively connected to an electronic equipment of a participant in the electronic payment system; or wherein the secure transaction unit is a secure wallet that is hosted at a service provider unit.

13. The secure transaction unit according to claim 10, wherein the secure memory comprises a token storage storing one or more tokens.

14. The secure transaction unit according to claim 10, wherein the hash value is derived as a result from a SHA-512-algorithm or a SHA-256-algorithm.

15. An electronic payment transaction system comprising:

a secure token issuing unit comprising at least one processor and a memory storing instructions that, when executed by the at least one processor, cause the secure token issuing unit to:

generate a new token to be issued in the electronic transaction system; and delete tokens to be deleted from the electronic transaction system; and a plurality of secure transaction units according to claim 10; and one or more token reference register for registering the tokens of the electronic transaction system.

* * * * *